United States Patent [19]

Gibb

[11] 4,040,542

[45] Aug. 9, 1977

[54] CLEARING WHEEL ASSEMBLY FOR THREAD ROLLING MACHINE AND THE LIKE

[75] Inventor: James Francis Gibb, Terryville, Conn.

[73] Assignee: The Hartford Special Machinery Company, Simsbury, Conn.

[21] Appl. No.: 626,365

[22] Filed: Oct. 28, 1975

[51] Int. Cl.² .............................................. B65H 9/00
[52] U.S. Cl. ................................... 221/162; 198/389
[58] Field of Search ................................ 221/159-162, 221/163, 165, 167, 168, 172-173, 186, 188, 189, 200, 203-205, 277; 198/288, 276, 283, 389; 222/414

[56] References Cited

U.S. PATENT DOCUMENTS

| 97,425 | 11/1869 | McSherry | 222/414 |
| 1,517,139 | 11/1924 | Wilcox | 221/162 |
| 2,531,099 | 11/1950 | Anderson | 221/162 |
| 2,613,374 | 10/1952 | Gora | 221/167 |
| 3,044,660 | 7/1962 | Troll et al. | 198/288 |
| Re. 25,297 | 12/1962 | Garrett | 221/162 |

*Primary Examiner*—Robert B. Reeves
*Assistant Examiner*—H. Grant Skaggs
*Attorney, Agent, or Firm*—Prutzman, Hayes, Kalb & Chilton

[57] ABSTRACT

Clearing wheel assembly is provided for combing out headed objects improperly oriented on a feed track and features an arcuate shield precluding undesired discharge of the objects from a hopper.

1 Claim, 3 Drawing Figures

CLEARING WHEEL ASSEMBLY FOR THREAD ROLLING MACHINE AND THE LIKE

This invention generally relates to article feeding devices and particularly concerns apparatus for feeding headed objects to a work station.

A primary object of this invention is to provide a new and improved high speed feeding apparatus for reliably delivering headed objects, particularly work blanks of extremely small size, to a work station in a rapid controlled manner with each object properly oriented for a work operation to be performed.

Another object of this invention is to provide such an apparatus particularly useful with machines, such as slotters, point formers, thread rollers and similar apparatus handling headed objects, which apparatus is not only rapidly and easily installed in existing machines but is readily incorporated in new machines for high speed reliable transfer of properly oriented headed objects.

A further object of this invention is to provide such an apparatus which is of a rugged construction and which operates to effect a continuous work blank clearing operation to effectively prevent jamming of the delivery system under demanding high speed operating conditions.

Other objects will be in part obvious and in part pointed out more in detail hereinafter.

A better understanding of this invention will be obtained from the following detailed description and the accompanying drawings of an illustrative application of the invention.

Figure 1:
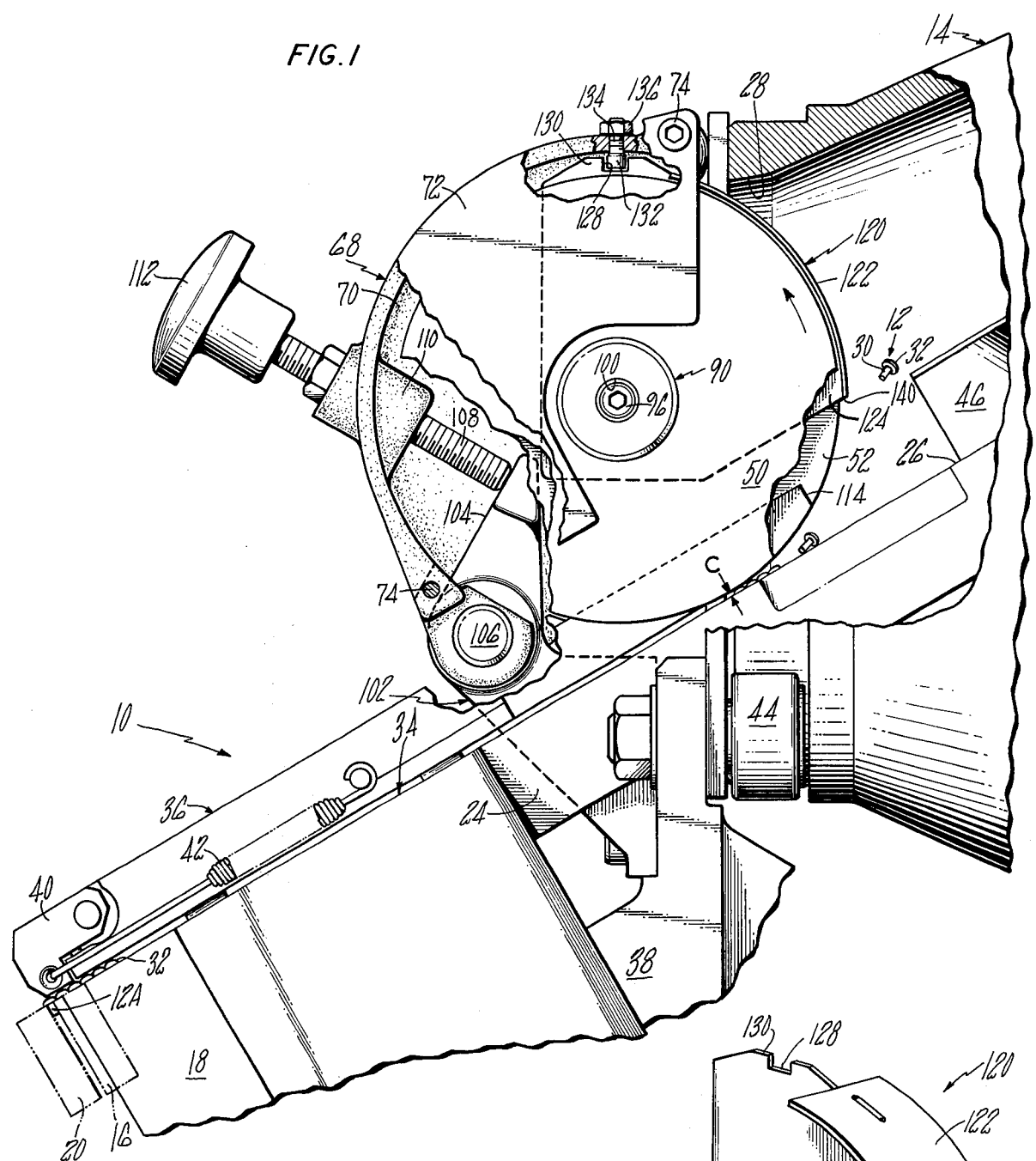
FIG. 1 is a side elevational view, partly broken away and partly in section, illustrating certain components of an apparatus incorporating this invention.
Figure 3:
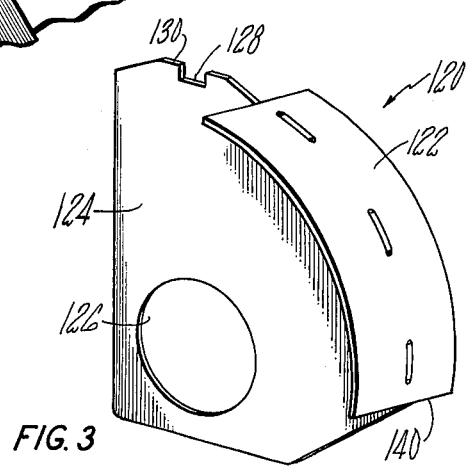
FIG. 3 is an isometric view of a shield particularly designed for use in this invention.
Figure 2:
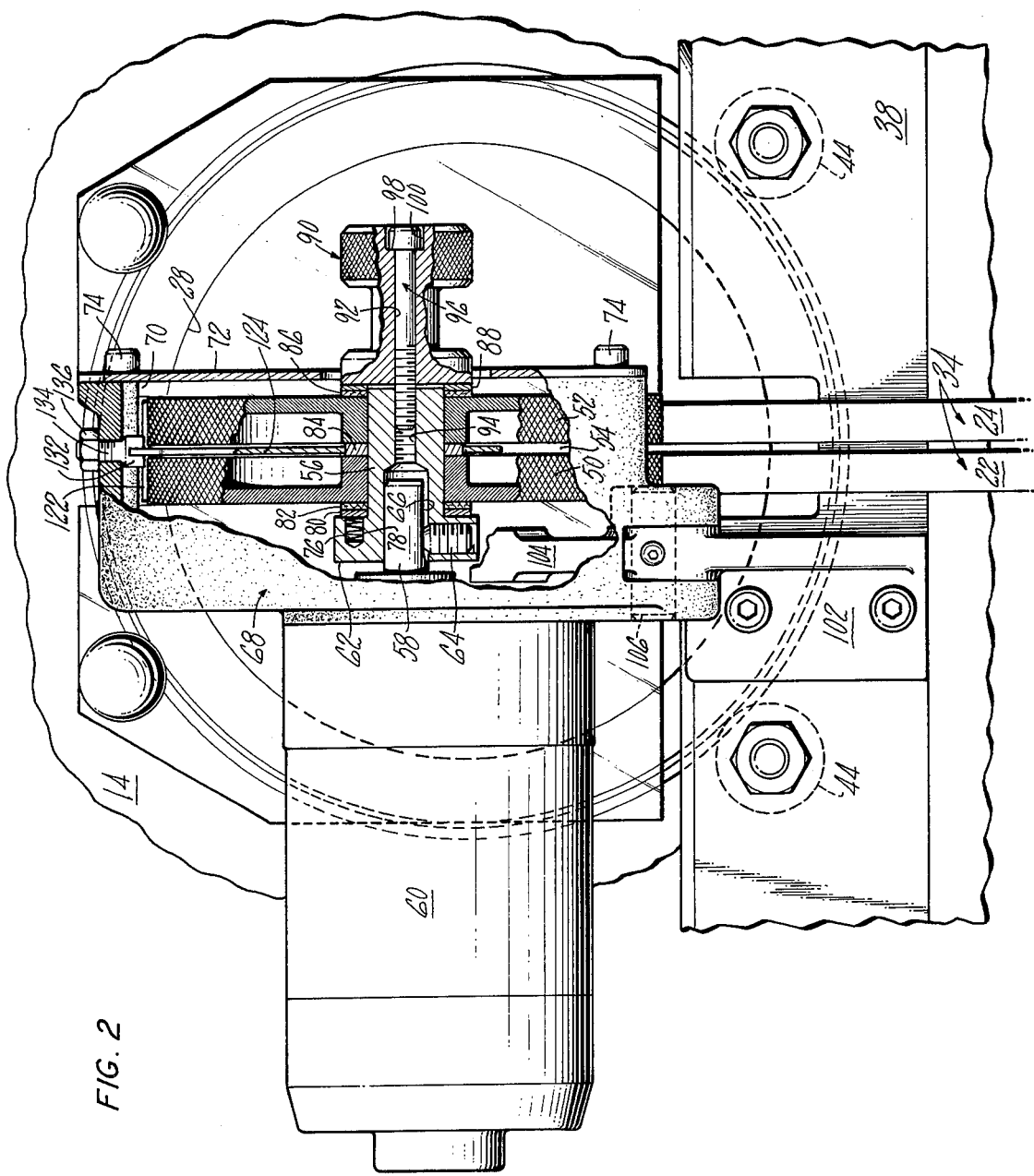
FIG. 2 is an enlarged front elevational view, partly broken away and partly in section, of the apparatus of FIG. 1 with certain of the components removed for purposes of clarity.

Referring now to the drawings in detail, this invention is shown incorporated in a construction, which for illustrative purposes, is depicted as being installed on a thread rolling machine 10. The machine 10 is for purposes of illustration, and it will be understood that the invention may be used with a variety of machines for different applications which require a feeding device for conducting headed objects such as work blanks 12 from a drum or hopper such as shown at 14 to a work performing station. In the type machine illustated, a thread forming station is shown which includes a fixed die 16 secured to a bed 18 of the machine 10 and a movable die 20 suitably driven to reciprocate in a direction parallel to the fixed die. A movable combination gate and starter finger, not shown, is provided between the dies to control discharge of the work blanks into position between the dies, as shown by work blank 12A, at the beginning of each thread rolling operation.

A pair of parallel feed rails 22 and 24 are shown having an upper input end 26 located within the hopper 14 with the rails extending downwardly through its discharge opening 28 to a lower output end adjacent the leading edge of the fixed die 16. The rails 22, 24 are shown inclined for gravity feed of the blanks 12 and are spaced in confronting relation to one another by an amount sufficient to receive the shank 30 of each blank 12 while supporting its head 32 for movement along a pair of coplanar upper surfaces defining a track 34 for the work blanks 12.

A track cover 36 is mounted on machine frame 38 with a lower end extension 40 supported for pivotal movement. The extension is provided with a latch mechanism 42 to pivot the lower track cover extension 40 toward and away from the track 34 to permit easy removal of malformed work blanks from the feed track 34.

As the speed of operation is increased and the output requirements of machine 10 correspondingly increase for high speed production, concomitant problems are faced in effective handling of the work blanks. These problems become more acute with lightweight blanks having extremely small size diameter shanks e.g., which are to be formed with threads wherein the shanks range in diameter from about 0.040 inch to about 0.110 inch. The feeding apparatus of this invention is directed to the provision of improvements at the input end of the feed rails 22, 24 to increase reliability of smooth, trouble-free delivery of blanks down the track 34 to the lower output end of the rails.

Turning first to the hopper 14, rollers such as at 44 are mounted on frame 38 of the machine 10 and support the hopper 14 for rotation. The hopper 14 has internal vanes, not shown, which lift work blanks 12 from the bottom of the drum and let them tumble down from the top of the drum. As these blanks 12 fall toward the bottom of the drum they engage a pair of plates such as the one shown at 46, which are inclined to form a V-shaped chute leading to the track 34 such that the blanks 12 impinge on the plates 46 and slide toward the feed rails 22,24. Because these blanks engage the rails in a random fashion only a few of the blanks which reach the rails will be properly oriented with the shanks received between the rails and the heads 32 seated on the track 34. Under normal conditions some blanks will be oriented head first; others will assume a position transverse to the feed rails; some of the blanks will have thier heads resting on the preceding blank or may be deposited on part of the track already filled with blanks. Such conditions would normally create a jam at the discharge opening 28 in the hopper 14, but such machine jamming is minimized by the provision of clearing wheels 50 and 52 which reject blanks improperly oriented back into the hopper 14. In addition, improperly oriented blanks tend to proceed down the feed rails 22, 24 and may also be driven through the discharge opening 28 about the periphery of clearing wheels 50, 52 or even through an axial clearance opening 54 between the clearing wheels in the case of exceptionally small diameter shanks of the type blanks described.

More specifically, the clearing wheels 50, 52 are shown as being a pair of relatively lightweight wheel halves or simply two clearing wheels which are shown mounted for free rotation in mirror-image relation to one another on a hub 56. The hub 56 is supported on an output shaft 58 drivingly connected to a motor 60. The hub 56 has a radial flange 62 with a set screw 64 threadably engaged with the hub 56 for seating engagement on a flat 66 in driving relation to output shaft 58.

In a preferred embodiment of this invention, a cast housing 68 is mounted on the frame 38 and has an outboard side opening 70 within which the clearing wheel assembly is operatively mounted on the motor output shaft 58 outside the hopper 14. The motor 60 and its associated drive components are shown secured to the housing 68 opposite its outboard side opening 70 which is illustrated as being enclosed by a guard 72 fixed by fasteners 74 to the housing.

A plurality of compression springs such as at 76 are mounted in spring chambers, such as illustrated at 78 in the radial flange 62 of the hub 56, with one end of the spring 76 seated within the chamber 78 and an opposite end of the spring 76 bearing against a thrust ring 80 seated against an annular bearing 82 formed of a suitable friction material interposed between the thrust ring 80 and clearing wheel 50. An annular spacer 84 is mounted on the hub 56 between clearing wheels 50 and 52. An outboard side of clearing wheel 52 has an annular friction bearing 86 similar to 82 mounted on hub 56 and interposed between the clearing wheel 52 and a thrust ring 88 which engages a manually manipulatable clearing wheel operating knob 90 having a central opening 92 coaxially aligned with an internally threaded end opening 94 within the hub 56. A machine bolt 96 extends from the central knob opening 92 into the hub 56 and is tightened to seat the head of the bolt 96 against the shoulder 98 of an enlarged diameter portion 100 of the central knob opening 92 to securely assemble the above described components which serve as a friction drive for the clearing wheels 50, 52.

The above described friction drive assembly serves to drive the wheels 50 and 52 at the same angular speed under normal operating conditions while providing an overload friction drive limiter for limiting the torque applied to the clearing wheels. This friction drive has been found to effectively prevent motor damage which might otherwise result from excessive torque being applied to the output shaft 58 beyond the torque capacity of its driving motor 60. The above described friction drive assembly also eliminates any possibility of the blanks 12 being simply ground up into waste material by the clearing wheels 50, 52 while additionally minimizing clearing wheel damage due to improperly oriented work blanks being fed down the feed track 34 to the discharge opening 28.

A fixed bracket 102 having a projecting lug 104 is secured to the frame 38 of the machine 10 and supports a pivot pin 106 on which the housing 68, motor 60 and its associated drive components are supported for swinging movement toward and away from a "set-up" position which will be understood as being the position assumed by the clearing wheels 50 and 52 when their rims are seated on the track 34 at the discharge opening 28 of the hopper 14.

By virtue of the above described construction, the lug 104 of the bracket 102 serves as a seat for clearing wheel height adjusting screw 108 which extends through an internally threaded member 110 integrally mounted in fixed relation to the housing 68. The adjusting screw 108 has a hand operated knob 112 on an outer exposed end of the screw. The adjusting screw 108 operates as a lead screw such that screw rotation in one direction serves to move the entire housing 68, the clearing wheels 50, 52 and motor assembly mounted thereon, with an arcuate motion in a counterclockwise direction about the pivot pin 106 as viewed in FIG. 1 to lift the clearing wheels 50, 52 relative to the track 34 to adjust the height of their peripheral rims. Rotation of the screw 108 in the opposite angular direction causes the assembly to be selectively returned in a direction toward the clearing wheel set-up position with the clearing wheel rims seated on the track 34.

The height of the peripheral rims of the clearing wheels 50, 52 relative to the underlying track 34 is accordingly selectively adjusted such that a minimum clearance "C" is provided at the discharge opening 28 of the hopper 14 to permit the heads 32 of the work blanks 12 to just pass under the clearing wheels 50, 52 when the work blanks are properly oriented with the bearing surfaces of the heads 32 properly seated on the track 34 and their shanks 30 extending in perpendicular relation to the track 34 between the feed rails 22, 24 for delivery from the hopper 14 to the work station.

It will also be understood that suitable track cover adjustment devices, not shown, are also provided to preset the spacing between cover assembly 36 and the feed track 34. Moreover, additional adjustment, not shown, will be understood to be provided to selectively adjust the spacing between the confronting feed rails 22, 24 in accordance with the shank diameter of the blanks being handled.

The clearing wheels 50, 52 rotate in a direction depicted in FIG. 1 as being a counterclockwise direction such that the direction of rotation of the clearing wheels 50, 52 adjacent the input end 26 of the feed track 34 and immediately above the track 34 is generally opposite the direction of feed of the properly oriented blanks passing under the clearing wheels 50, 52.

To further minimize any possibility of any work blanks, particularly those having exceedingly small diameter shanks, being carried by the clearing wheel rims around their arcuate path of movement and into a position on the track 34 downstream of the minimum clearance "C" between the wheels 50, 52 and track 34, peripheral rims of clearing wheels 50, 52 are each preferably knurled to provide gripping surfaces. Such construction ensures that the rim surfaces will effect positive frictional engagement to impinge upon a misoriented work blank for rejecting it from the feed rails but at the same time will not permit any work blanks to be lodged within any surface interruptions in the rims of the clearing wheels 50, 52. Such construction also obviates disadvantages presented by certain conventional clearing wheel designs featuring hotched or "toothed" rims wherein blanks with shanks of such small diameter (0.040 to 0.110 inch) will inevitably lodge and be driven out of the hopper 14 by the wheels.

An upwardly inclined upper end extension 114 of the track cover 36 is mounted in fixed relation in axial clearance 54 between the clearing wheels 50, 52 to maintain continuous control over the work blanks 12 which pass through the discharge opening 28 of the hopper 14 under the clearing wheels 50, 52 and into the main runway of feed rails 22, 24. I.e., the clearing wheels are spaced apart with the predetermined axial clearance 54, and the upper track cover extension 114 may be readily fixed between the wheels for added control over blank discharge from the hopper.

To also ensure against any possibility of the blanks impinging on the peripheral rims of the clearing wheels and being thrown out of the dicharge opening 28 of the hopper 14 under the driving force of the rotating clearing wheels, a shield 120 is illustrated as being mounted to circumferentially extend about those portions of the clearing wheel rims located within the hopper 14.

More specifically, the shield 120 includes an arcuate cover plate 122 and a flat mounting plate 124 secured intermediate opposite lateral sides of the cover plate 122 to extend in perpendicular relation to the cover plate 122. The flat mounting plate 124 has an opening 126 permitting the mounting plate 124 to be fitted over the hub 56 of the clearing wheels 50, 52 in surrounding relation to the spacer 84 therebetween to mount the shield 120 in fixed spaced relation to the rims of the clearing wheels 50, 52 disposed within the hopper 14. To this end, a notch 128 is cut-out in a radially enlarged upper extension 130 of the flat mounting plate 124 for receiving a head 132 of an upwardly projecting threaded fastener 134 shown extending through the housing 68 and secured by a locking nut 136. The arcuate cover plate 122 is preferably located adjacent the peripheral rims of the clearing wheels 50, 52 so as to prevent any possibility of blanks 12 becoming jammed between the wheels and the cover plate 122. In this respect, it has been found that for shank diameter sizes ranging, say, from 0.040 to 0.110 inch, a clearance from about 0.008 to 0.012 inch between the shield and wheels has been found to operate satisfactorily.

By virtue of the above described clearance between the clearing wheels 50, 52 and the shield 120, it will be seen that work blanks having exceedingly small size shanks will not be carried by the clearing wheels around their path of travel to jam the machine since the lead end 140 of the shield 120 serves as a knock-off abutment to dislodge any improperly oriented blanks which might otherwise follow the motion of the wheels 50, 52.

The shield 120 itself also precludes any blanks 12 being driven out of the discharge opening 28 of the hopper 14 under the driving force of the rotating clearing wheels. I.e., the circumferentially extending arcuate shield 120 is disposed within the hopper 14, and the width of the cover plate 122 is sufficient to effectively cover the rims of the clearing wheels 50, 52 whereby the shield 120 is in interfering relation to the path of movement any work blanks would normally take in being driven out of the hopper 14. Moreover, the flat mounting plate 124 serves as an effective closure for the axial clearance or spacing between the wheels to prevent any of the small size work blanks from being lodged or driven between the wheels and ejected or carried thereby about the circular path of movement of the wheels and leaving the hopper 14 by a path other than that defined by the feed track 34 and track cover 36.

During operation of the machine 10, if any work blanks 12 do succeed in being lodged in an improperly oriented position such that the blanks themselves serve to interfere with the rotational movement of the clearing wheels, the overload friction drive between the output shaft 58 of the motor 60 and the clearing wheels 50, 52 effectively serves to permit the wheels to be stopped with the drive motor 60 continuing to operate without damaging any of the component drive parts. Upon a jam occurring within the hopper 14, the clearing wheel operating knob 90 may be rotated by hand with the assembly in position to effect sufficient torque to dislodge any jammed blanks and permit the apparatus to resume normal operation. Should such action be insufficient, the clearing wheel assembly and its associated drive motor may be simply pivoted out of operative position as illustrated in FIG. 1 by pulling down the clearing wheel height adjusting knob 112 to swing the assembly counterclockwise about the pin 106 to expose the track 34 and permit one to dislodge any work blank causing any jam.

This invention effects rapid and reliable handling of extremely small diameter shanks of headed work blanks for delivery to a work station. The disclosed construction has been found to operate satisfactorily and to additionally preclude any possibility of the work blanks being driven out of the discharge opening of the hopper or between the clearing wheels. The relatively smooth, preferably knurled surfaces on the peripheral rim of the clearing wheels additionally minimize any possibility of the work blanks being carried about the rim of the clearing wheels and thereby minimize undesired jamming of the machine.

As will be apparent to persons skilled in the art, various modifications, adaptations and variations of the foregoing specific disclosure can be made without departing from the teachings of this invention.

I claim:

1. Apparatus for feeding headed work blanks of small size to a work station and comprising a rotary hopper for tumbling the work blanks, the hopper having a discharge opening, a pair of feed rails for receiving blanks from the hopper to be fed to the work station, the feed rails defining a track for supporting the head of each blank with its shank received between the rails, the track having an input end located within the hopper with the track extending through the discharge opening, a pair of clearing wheels spaced apart side-by-side and coaxially supported for rotation adjacent the hopper in aligned relation to the track, the clearing wheels received within the discharge opening and located in part within the hopper in elevated spaced relation to the track to define a predetermined minimum clearance therebetween sufficient to permit the head of a blank to pass under the clearing wheels in a direction generally opposite the angular direction of rotation of the clearing wheels adjacent the track when the blank is properly oriented with its head seated on the track, the clearing wheels each having a circumferentially extending peripheral rim with a knurled surface pattern providing a gripping surface for clearing improperly oriented blanks from the input end of the track while preventing blank trapping or lodging within the rim, and a shield having an arcuate cover plate and a flat mounting plate secured to the cover plate in perpendicular relation thereto for mounting the shield in fixed relation to the clearing wheels, the cover plate circumferentially extending about arcuate portions of the clearing wheels located within the hopper in interfering relation to the path of movement of blanks being driven out of the hopper discharge opening under the driving force of the rotating clearing wheels, the cover plate being spaced outwardly from said arcuate portions of the clearing wheels located within the hopper and defining a radial clearance between the clearing wheels and the shield cover plate, said radial clearance being less than the shank diameter of the blanks being handled, the flat mounting plate of the shield being located within the space between the clearing wheels within the hopper above the track and substantially filling space to reduce the clearance between the shield plate and the wheels to a dimension less than the shank diameter of the blanks being handled.

* * * * *